United States Patent [19]

Hofmann et al.

[11] Patent Number: 4,812,058

[45] Date of Patent: Mar. 14, 1989

[54] CAGE FOR TAPERED ROLLER BEARINGS

[75] Inventors: Heinrich Hofmann, Schweinfurt; Manfred Tröster, Bad Kissingen, both of Fed. Rep. of Germany

[73] Assignee: FAG Kugelfischer Georg Schafer (KGaA), Fed. Rep. of Germany

[21] Appl. No.: 209,991

[22] Filed: Jun. 22, 1988

[30] Foreign Application Priority Data

Jul. 14, 1987 [DE] Fed. Rep. of Germany ....... 3723168

[51] Int. Cl.$^4$ ............................................. F16C 33/46
[52] U.S. Cl. .................................... 384/563; 384/572; 384/576; 384/579
[58] Field of Search ............... 384/563, 572, 576, 579, 384/526, 575

[56] References Cited

U.S. PATENT DOCUMENTS

| | | | |
|---|---|---|---|
| 1,356,790 | 10/1920 | Scribner | 384/579 |
| 3,050,353 | 8/1962 | Bratt | 384/579 |
| 4,523,862 | 6/1985 | Yasui et al. | 384/576 |
| 4,620,806 | 11/1986 | Rabe | 384/572 |

*Primary Examiner*—Lenard A. Footland
*Attorney, Agent, or Firm*—Ostrolenk, Faber, Gerb & Soffen

[57] ABSTRACT

A tapered roller bearing has an outer ring and an inner ring, a row of rollers between the rings and a cage or separator. The inner ring has spaced apart flanges or lips between which the rollers move. The cage includes an annular ring at the radially smaller side which has undulations circumferentially around that ring. The undulations have axially inwardly directed crests that rest against and are pretensioned to urge the rollers toward the other inner ring flange. The webs of the cage between neighboring rollers have radial projections which engage the flange at the radially smaller side of the bearing. The distance between the plane which passes through the axial end surfaces of those radial projections and the plane which is defined by the tips of the undulation crests against the ends of the rollers is slightly greater than the difference between the distance apart of the flanges and the length of the rollers between the flanges.

2 Claims, 1 Drawing Sheet

CAGE FOR TAPERED ROLLER BEARINGS

BACKGROUND OF THE INVENTION

The present invention refers to a cage or separator for the rolling elements of a tapered roller bearing.

A tapered roller bearing shown in Federal Republic of Germany AS 16 25 643 has a cage with radially directed undulations that cause the cage or rolling element separator to become conical. This cage is particularly well suited for use in tapered roller bearings. If such cages are mounted along with the rollers on roller bearing inner rings which have flanges, or shoulders or lips on both axial sides of the rollers, then, while mounting is possible over the smaller radius flange by pressing the rollers somewhat radially outward within the clearance provided by the pocket between the rings, a unit which has been premounted in this way still has certain disadvantages. The rollers can "hang through" radially within the clearance within the pockets and between the flanges. This, in turn, makes mounting of the bearing outer ring substantially more difficult. Furthermore, mounting of the entire bearing in a machine part is made substantially difficult if, as customary, the bearing must be adjusted axially. For this, it is necessary to place the assembled bearing in operation until the rollers, traveling over the conical surface of the inner ring, have come against the end of the large flange or lip. Only when the rollers are in this position can the axial play be correctly adjusted.

SUMMARY OF THE INVENTION

It is therefore the object of the invention to improve the cage or separator of a tapered roller bearing so that it does not have the above indicated disadvantages, whereby assembly of the bearing and mounting of the bearing in a machine is facilitated and shortened.

The tapered roller bearing is comprised of an outer ring and an inner ring with tapering raceways which together define a tapered shape space between then in which a row of tapered shape rollers are disposed. The rollers are separated and positioned through being supported in the pockets of a window cage in the space between the rings The cage has two annular, axially opposite rings, namely, the small side ring at the radially smaller side of the row of rollers and the radially larger ring at the radially larger side of the row of rollers. Webs of the cage disposed between neighboring rollers separate the rollers and, with the side rings, the cage webs complete the pockets in the window cage.

The inner ring of the bearing is provided with axially spaced apart flanges or lips which define a pocket through which the rollers move. The radially smaller size annular ring of the cage is undulating in shape around the annular ring. The undulations have circumferentially spaced apart axially inwardly projecting crests, spaced apart such that a respective crest rests against the end of each roller and is slightly prestressed to press the rollers toward the radially larger ring.

The undulations in the small cage ring are directed axially rather than radially. The undulation crests lie with a slight initial stress against the ends of the rollers. As a result, the rollers are continuously urged toward the large cage ring. In order that the cage can be supported axially in the bearing, radial projections, which engage behind the small flange of the bearing inner ring, are provided on the cage webs, which webs extend between neighboring rollers to connect the rings of the cage. In the assembled condition of the bearing, the radial projections from the cage web then come against the axially inner face of the small flange, and the cage is thus fixed axially. The axial undulations then press the rollers from this position towards the large flange, where they come to rest under slight initial stress. In this way, the rollers are held better on the bearing inner ring.

To facilitate best operation and mounting, the various elements described above are particularly shaped and sized. There is a plane which passes through the axial end surfaces of the radial protections from the cage webs. Further, there is a plane which is defined by the axially inward tips of the undulation crests. There is a small but measurable difference between the two planes just mentioned. There is also a distance apart of the inner ring flanges or lips between which the rollers move and the lengths of the rollers themselves, and that also is a small difference. For preferred mounting of the rollers, the distance between the plane which passes through the axial end surfaces of the projections and the plane which is defined by the tips of the undulation crests is slightly greater than the difference between the distance apart of the flanges or lips and the length of the rollers. As a result, mounting of the bearing outer ring is facilitated since individual rollers can no longer hang through radially so far, for instance, in the direction of gravity that their end comes into contact with the end surface of the outer ring. Even more important, however, is the advantage that after the assembly of the entire bearing and its installation in the machine, the rollers are already in the proper position The axial play or the initial stress can now be properly adjusted immediately. It is no longer necessary to place the bearing in operation in order for rollers, which may not have been properly positioned axially, to be pressed towards the large flange. In this way, time is saved and the risk of incorrect adjustment of the bearing is also reduced.

The undulations, which are integrated with the small side ring of the cage, furthermore have the advantage that no additional parts are necessary, for instance, separate springs. In addition, in this way, the small side ring of the cage becomes more resilient. As a result, the radial projections of the cage webs can be snapped more easily over the small flange ring.

BRIEF DESCRIPTION OF THE DRAWINGS

Other objects and features of the invention are explained with reference to the drawings, in which.

DESCRIPTION OF A PREFERRED EMBODIMENT

Figure 1:
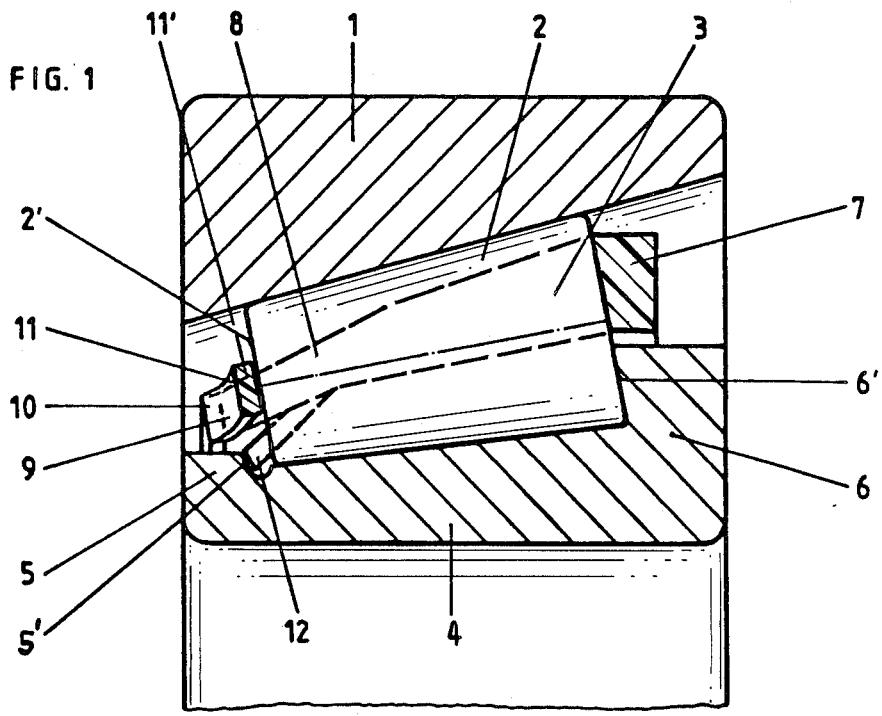
FIG. 1 shows a partial, fragmentary cross section through a tapered roller bearing having the cage in accordance with the invention.

FIG. 1 shows a fragment of a tapered roller bearing. The bearing comprises an outer ring 1 with an inwardly facing outer raceway, rollers 2 which are arranged in pockets or windows of the window cage or separator 3, and an inner ring 4 with an outwardly facing inner raceway which has annular flanges or lips 5 and 6 around the ring on both axial sides.

The cage 3 is provided on the radially larger lateral side with the side ring 7 and is provided on the radially smaller lateral side with the side ring 9. The ring 7 is connected with the ring 9 via the webs 8 which are arranged between the rollers 2 at spaced intervals around the side rings and which together with the side rings define the windows of the cage.

Figure 2:
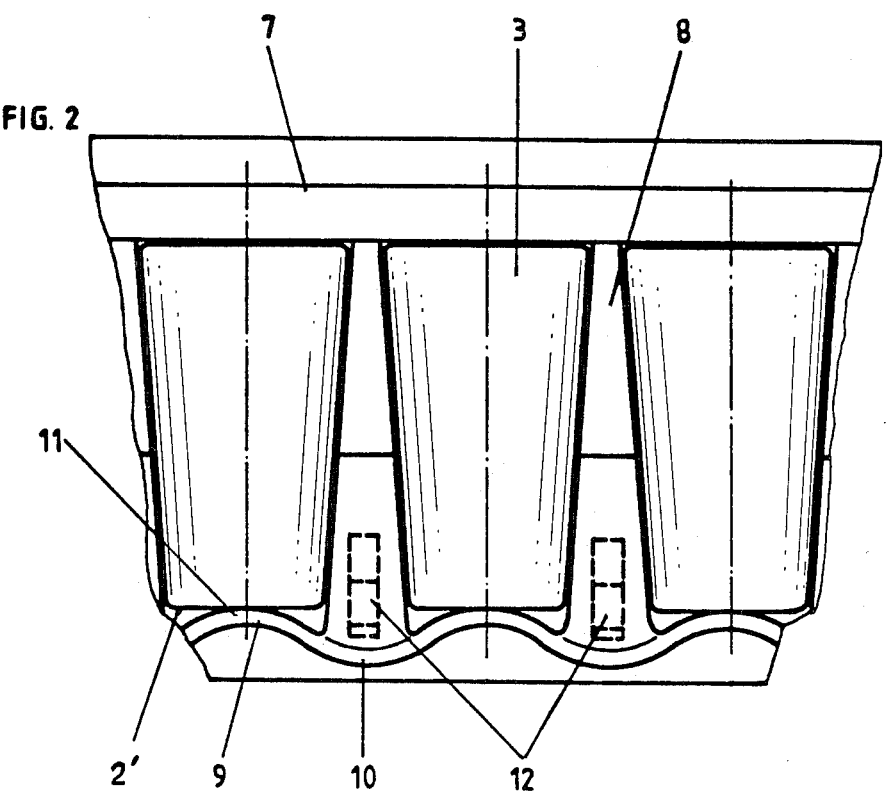
FIG. 2 shows a portion of the cage of FIG. 1, seen in radial view from the outside.

Upon assembly of the bearing, in order that the rollers 2 are always pressed against the axially inward end surface 6' of the large flange or lip 6 of the inner ring, the small side ring 9 of the cage is not a uniformly profiled ring. Instead, it is formed of approximately axially directed undulations 10, seen in FIG. 2. The undulations alternately project axially inwardly toward the rollers and axially outwardly. The undulations have axially inward crests 11 produced in this way and the crests are placed around that ring so that they lie, with slight initial stress, against the axial ends 2' of the rollers 2 to press the rollers toward the large side ring 7 and toward the inward surface 6' of the large flange or lip 6.

The desired application of the rollers against the large flange 6 results from the radial, somewhat obliquely inclined, generally radially inwardly and generally axially outwardly inclined projections 12 from the cage 3 resting against the axially inwardly directed face 5' of the flange 5 or lip. The desired axial pressure upon the rollers is obtained when the distance between the plane which passes through the axial end surfaces of the radial projections 12 and the plane 21, which is determined by the undulation crests 11', is slightly larger than the difference between the distance apart of the flanges 5, 6 and the length of the rollers 3.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A tapered roller bearing comprising an outer ring with an annular inwardly facing outer raceway, an inner ring inside the outer ring with an annular, outwardly facing inner raceway, the inner ring raceway having axially inwardly facing opposite, spaced apart flanges;

a row of tapered bearing rollers disposed between the inner raceway and the outer raceway for rolling thereover and disposed in the space in the inner ring between the flanges;

a cage comprising a radially smaller annular ring disposed at the radially smaller side of the row of rollers, a radially larger annular ring disposed at the radially larger side of the row of rollers, a plurality of webs disposed at intervals around the rings of the cage for joining the cage rings, and a respective web being disposed between neighboring rollers in the row of rollers for separating the rollers;

one of the side rings of the cage being undulating in shape annularly around the ring with successive undulations undulating axially inwardly toward the rollers and axially outwardly from the rollers, the undulations on the one ring being placed for defining axially inwardly projecting crests on the undulations and the crests are each being respectively located at a respective axial end of one of the rollers, and the one side ring being shaped and placed for the undulation crests to apply force against the rollers and being slightly prestressed for urging the rollers toward the other side ring and toward the inner ring flange at the side of the rollers away from the one ring;

each of the webs having a generally radially inwardly directed projection which also extends axially outward and engages the one inner ring flange at the one side ring of the cage, the projections having axial end surfaces which engage the one flange; the crests on the undulations have tips which engage the adjacent ends of the rollers;

the distance between the plane which passes through the axial end surfaces of the radial projections from the webs and the plane defined by the tips of the undulation crests is slightly greater than the difference between the distance apart of the flanges of the inner ring and the length of the rollers disposed between the flanges.

2. The tapered roller bearing of claim 1, wherein the one ring is the radially smaller axial side ring of the cage and the projections from the web project against the one inner ring flange at the radially smaller side of the cage.

* * * * *